United States Patent [19]

Abruzzo et al.

[11] 3,918,304

[45] Nov. 11, 1975

[54] FLOWMETER COMPUTER

[75] Inventors: Joseph Abruzzo, Severna Park;
Frederick J. Lori, Crofton;
Theodore W. Synowka, Glen Burnie;
Lawrence G. Wright, Pasadena;
William H. Foertsch, Linthicum Heights, all of Md.

[73] Assignee: Westinghouse Electric Corporation, Pittsburgh, Pa.

[22] Filed: July 9, 1974

[21] Appl. No.: 486,929

Related U.S. Application Data

[63] Continuation of Ser. No. 418,636, Nov. 23, 1973, abandoned.

[52] U.S. Cl. ............................................. 73/194 A
[51] Int. Cl.² ............................................. G01F 1/66
[58] Field of Search ............... 73/194 A; 235/151.34

[56] References Cited
UNITED STATES PATENTS

| 2,534,712 | 12/1950 | Gray | 73/194 A |
|---|---|---|---|
| 3,336,801 | 8/1967 | Snavely | 73/194 A X |
| 3,402,606 | 9/1968 | Bruha | 73/194 A |
| 3,440,876 | 4/1969 | Hayes et al. | 73/194 A |
| 3,537,309 | 11/1970 | Geohegan, Jr. et al. | 73/194 A |
| 3,546,935 | 12/1970 | Bruha | 73/194 A |
| 3,564,912 | 2/1971 | Malone et al. | 73/194 A |
| 3,631,719 | 1/1972 | Charvier et al. | 73/194 A |

FOREIGN PATENTS OR APPLICATIONS

| 1,203,310 | 8/1970 | United Kingdom | 235/151.32 |

OTHER PUBLICATIONS
Loosemore et al., "A New Ultrasonic Flowmeter," Ultrasonics, Jan. 1969, pp. 43–46.

*Primary Examiner*—Charles A. Ruehl
*Attorney, Agent, or Firm*—J. B. Hinson

[57] ABSTRACT

A system for accurately determining the velocity of a liquid relative to a pair of transducers disposed therein by exciting the transducers to inject acoustic signals into the liquid and measuring the time required for the signals to travel between the transducers to generate elapsed time signals is disclosed. From these elapsed time signals the velocity of the liquid relative to the transducers is calculated and from the velocity and the cross sectional area of the channel through which the liquid flows the flow rate of the liquid is calculated. The system is controlled and the elapsed time signals are processed by a hard wire programmable digital processor.

5 Claims, 6 Drawing Figures

FLOWMETER COMPUTER

This is a continuation of application Ser. No. 418,636, filed Nov. 23, 1973, now abandoned.

BACKGROUND OF THE INVENTION

1. Field of the Invention

This invention relates to velocity measurements and more particularly to methods and apparatus for measuring the velocity of a liquid and to the calculation of the flow rate of the liquid based on these velocity measurements.

2. Description of the Prior Art

Accurate flow rate measurements using prior art apparatus are difficult except in a laboratory environment or under carefully controlled conditions. Additionally, many of these prior art flow rate measurement devices require restrictions such as flow nozzles, for example, to be placed in the line through which the liquid flowed. Measurements of the flow rate of open streams was also difficult because of the problem of compensating the measurement for a change in the level of the stream and by the fact that restrictions in the stream were either impractical or impossible.

In addition to being somewhat inaccurate, restrictions in the flow path introduced head losses. Accuracy of measurements made with prior art apparatus were also affected by the viscosity of the liquid and by fouling of the transducers and flow channels.

SUMMARY OF THE INVENTION

The above discussed disadvantages of the prior art systems are substantially overcome by the disclosed system. The disclosed system comprises a leading edge flow meter and a digital processor permitting the signals of the leading edge flow meter to be processed without losing accuracy. The digital processor preferably includes a hard wired digital computer designed such that program changes between different applications can be made by changing constants in the computer program and by changing program modules. Expansion of the program can be made by modifying the programming unit of the digital processor. The processor is preferably constructed in at least three functional blocks designated the arithmetic unit, the programming unit and the preprocessor unit. The arithmetic unit performs all the calculations necessary to determine the flow rate of the liquid of interest under the control of the programming unit and the preprocessor converts signals from the leading edge flowmeter into digital numbers and performs other logic functions, such as selecting the transducers used to measure the elapsed time in systems which utilize more than one pair of transducers. Constants required by the program are preferably generated by pre-wired plug-in modules so that each of the flow measuring systems are essentially identical as far as the basic hardware is concerned. The leading edge flowmeter is well known in the art and, therefore, will not be discussed in detail here.

The disclosed apparatus and method for measuring the velocity and the flow rate of a liquid with respect to transducers is particularly advantageous because elapsed time signals indicative of the time required for the acoustic signals to travel through the flowing liquid can be accurately determined from the signals generated by the leading edge flowmeter without placing obstructions in the path of flow of liquid. The flow rate is then accurately calculated from these elapsed time signals by the arithmetic unit without making simplifying assumptions common to many prior art systems. The system is also very adaptable to many types of flow and velocity measurements ranging from small diameter pipes to large rivers. The elapsed time signals have a predetermined relationship to the average flow or the average velocity of the liquid across the entire path as compared to many prior art systems which only measured the velocity or the flow rate of the liquid at one particular point. This averaging is necessary to accurately determine the flow rate when turbulence or non-uniform velocity changes exist. The arithmetic unit averages a plurality of elapsed time signals to further improve the accuracy of the flow calculation.

The disclosed system is also easily adapted to systems where the fluid may flow in either direction. This is a significant improvement over flow nozzles which are generally limited to one directional flow.

The system is also easily modified to measure the speed of a ship through the water because the basic measurement made is the relative velocity between the transducers and the liquid.

The leading edge flow meter is bidirectional. This permits the system to be used to generate net flow signals in situations where the flow may be bidirectional.

DETAIL OF THE DESCRIPTION

For purposes of this application the following terms and definitions will be used.

1. An acoustic signal is defined as any signal which can be transmitted through a medium, the velocity of which with respect to the transducers capable of transmitting and receiving said signals is sought to be measured and characterized such that the elapsed time for said signal to travel from one transducer through said medium to a second transducer is a predictable function of the velocity of said medium with the respect to said transducers.

2. A programmable digital processor is defined as a digital machine designed to sequentially perform a series of defined operations with the order in which said operations are performed by said processor defining the function of said processor and in which means is included for changing the order and number of such operations without fundamentally altering the structure of said processor.

3. A hard wired programmable digital processor is defined as a digital machine designed to sequentially perform a series of defined operations with the order in which said operations are performed defining the function of said processor and which includes means for defining the function of said processor by selectively coupling together signal paths without fundamentally altering the structure of the processor. In the disclosed embodiment this selective coupling is preferably performed by plug-in program modules.

Figure 1:
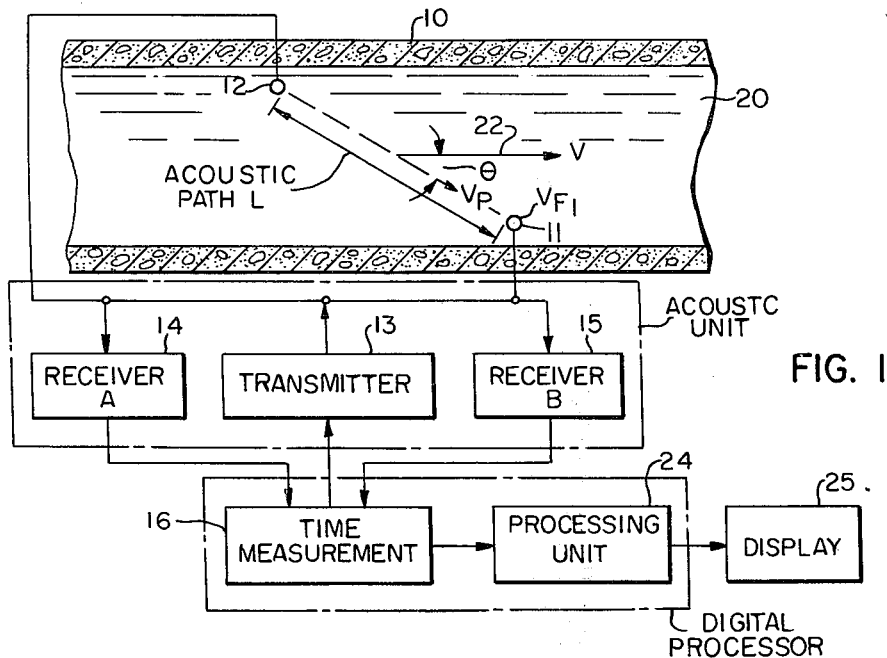
FIG. 1 is a functional block diagram of the acoustic flow meter system.
Figure 1A:
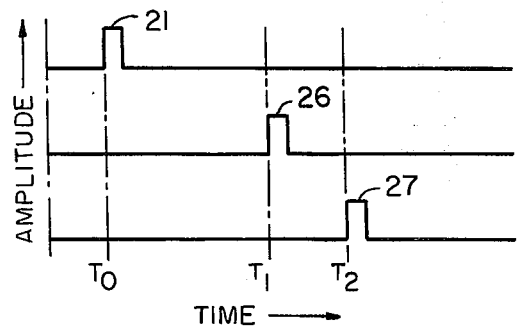
FIG. 1A is a timing diagram for the system of FIG. 1.

FIG. 1 is a functional block diagram of the flowmeter computer system. The system as illustrated is designed to measure the flow through a closed conduit using only a single pair of transducers 11 and 12. The transducers 11 and 12 are excited by a transmitter 13 and the output signals of the transducers 11 and 12 are received by two receivers 14 and 15. Time measurement apparatus 16 measures the shortest elapsed time between signals received by transducers 11 and 12 to generate a first elapsed time signal. The transit time from transducer 11 to transducer 12 and from transducer 12 to transducer 11 will be different and a function of the velocity of the fluid 20 with respect to the transducers 11 and 12. These differences in time are due to the fact that when the acoustic signal and the liquid 20 are traveling in the same direction their velocities will add to each other and when they are traveling in the opposite direction their velocities will substract. The difference in these two transit times is measured to generate a second elapsed time signal. The timing for these signals is shown in FIG. 1A. Each of the transducers 11 and 12 are excited by a pulse 21 (FIG. 1A) at time $T_0$ to simultaneously inject acoustic signals into to the liquid 20. Assuming that the liquid 20 is traveling in a direction illustrated by arrow 22 receiver 15 will detect an acoustic signal at time $T_1$ and generate a pulse 26. At a later time $T_2$, receiver 14 will detect an acoustic signal traveling from transducer 11 to transducer 12 and generate a second pulse 27. The elapsed times between $T_0$ and $T_1$ and between $T_1$ and $T_2$ are respectively the first and second elapsed time signals previously discussed.

The time measuring apparatus 16 will measure the elapsed time between time $T_0$ and $T_1$ and between $T_1$ and $T_2$ and generate digital numbers representative of these values. From these values the processing unit 24 will calculate the average velocity of the fluid 20 through the conduit 10 and from this velocity calculate the flow rate of the liquid 20 through conduit 10 and update a display 25 to indicate the average velocity of the fluid 20 and the flow rate of this liquid in terms of gallons per hour or other suitable units. The display used with the system preferably includes data formatting and processing equipment thereby simplifying the functions performed by the arithmetic unit.

The apparatus comprising the leading edge flowmeter and its application to flow measurement problems is fully discussed in an article entitled "The LE Acoustic Flowmeter and Application to Discharge Measurement" by Calvin R. Hastings presented at the annual convention of the New England Water Works Association at Boston, Mass. Sept. 21st through the 24th 1969 and in U.S. Pat. No. 3,564,912 issued to J. T. Malone et al. These references are incorporated herein by reference.

As previously discussed, the digital processor comprises three basic units, an arithmetic unit, a programming unit, and a preprocessor unit. Functional block diagrams of these units are respectfully shown in FIGS. 2, 3 and 4.

Figure 2:
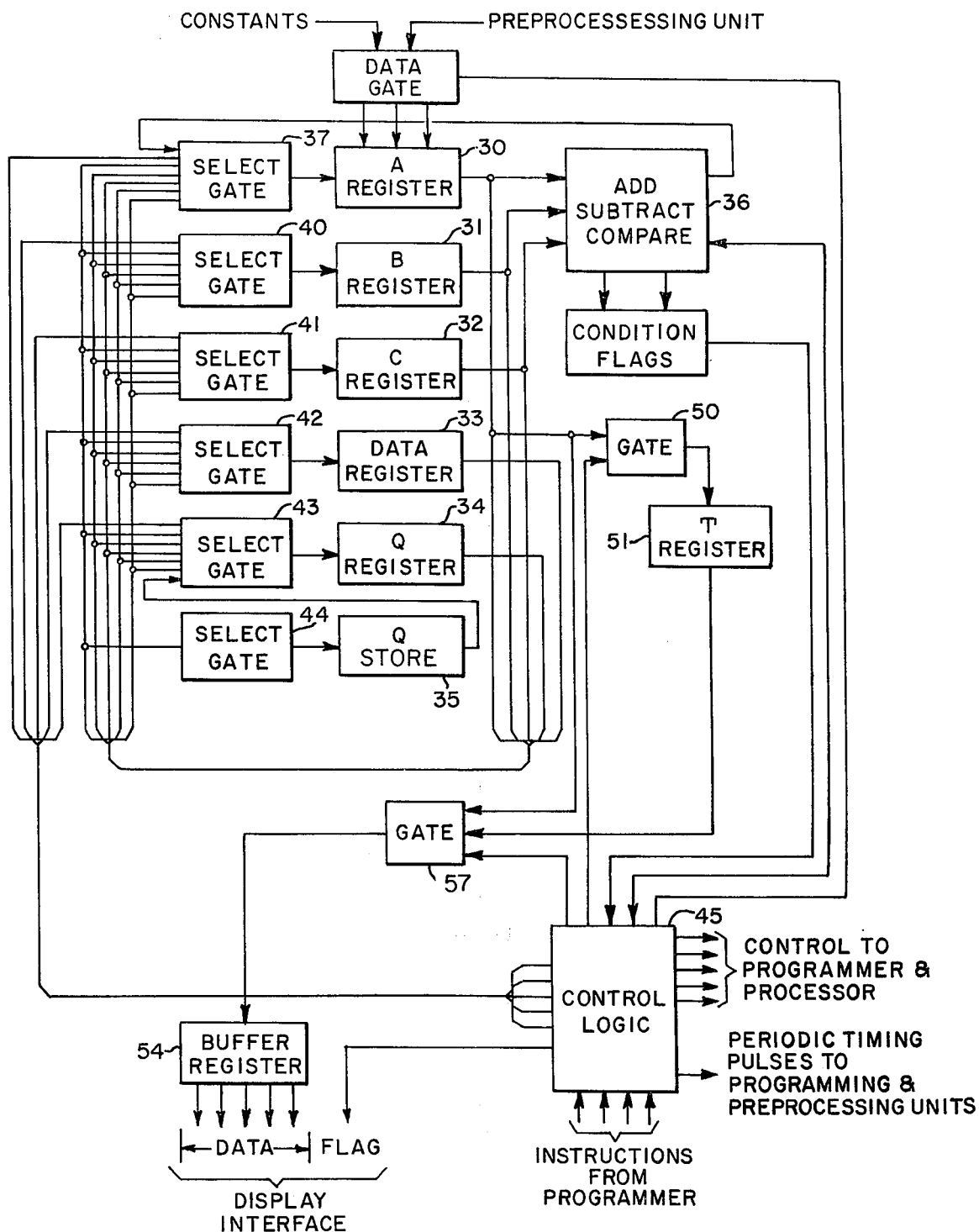
FIG. 2 is a functional block diagram of the arithmetic processor.

The arithmetic unit illustrated in FIG. 2 is capable of doing all the standard arithmetic operations and performing a defined number of logic operations, such as the comparison of two numbers. The arithmetic unit includes three arithmetic registers, A, B and C, respectively illustrated at reference numerals 30, 31, and 32. The arithmetic unit also includes a data register, a Q register and a Q store register respectively illustrated at reference numerals 33, 34 and 35. The detail functions of these will be explained later. Add, subtract and compare logic 36 is coupled to the output of the arithmetic registers with the output of this logic recirculated into the A register 30 by the select gate 37. Select gates 37 and 40 through 44 also permit the output of the various registers to be selectively recirculated through the input of these registers to permit data transfers among these registers. These transfers as well as the arithmetic and logical operations are controlled by control logic illustrated at reference numeral 45. The output of the A register 30 can also be selectively transferred through a transfer gate 50 to the T register 51. The control logic 45 receives instructions from the programming unit and sends control signals to the programming and the preprocessor units. The control logic 45 also generates periodic time pulses which are coupled to the programming and preprocessing units to periodically cause the system to begin a new measurement cycle and generates all the signals necessary to coordinate all the functions of the arithmetic unit. Constants from the programmer and data from the preprocessor are also gated into the A register 30 under the control of the control logic 45. A buffer register 54 provides a convenient means for updating the display devices by the digital data processor. The data register is loaded from the T register or the A register through a transfer gate 57. When the buffer register 54 has been loaded with data, a flag is set by the control logic 45 to indicate to the display device that data has been stored in the buffer and is ready for transfer to the display device. If more than one display device is to be updated by the processor, a suitable number of the bits in the buffer register 54 may be allocated to the purpose of specifying which display device will be updated by the data that is stored in the buffer register. The display interface is shown in FIG. 2.

Figure 3:
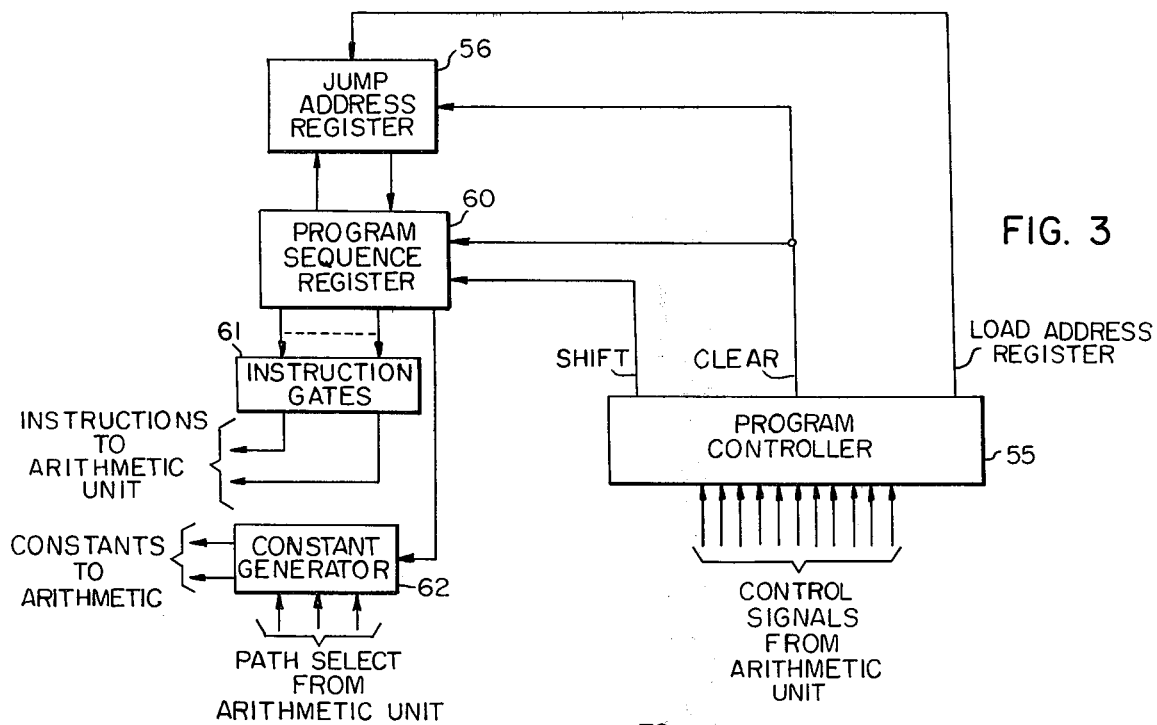
FIG. 3 is a block diagram of the programmer for use with the arithmetic processor illustrated in FIG. 2.

FIG. 3 is a functional block of the programming unit which controls the arithmetic unit. The programming unit includes a program controller 55, a jump address register 56, a programmer sequence register 60, a gate matrix 61 and a constant generator 62. The programmer controller 55 receives control and path select signals from the arithmetic unit. The control signals from the arithmetic unit are coupled to the programmer controller 55 which in turn controls the jump address register 56 and the program sequence register 60 to generate the proper instructions which are coupled through the gate matrix 61 to the arithmetic unit. The program sequence register 60 is a sequencer (commonly referred to as a ring counter) with one step in the sequence corresponding to each instruction to be executed by the arithmetic unit. The jump address register 56 is also a series of flip-flop indicating to which point the program sequence is to be set when a jump instruction is executed by the processor (these instructions will be defined in detail later). The instruction gates 61 is a series of the gates connected to generate the proper control signals and couple these signals to the arithmetic processor. The program to be executed by the arithmetic unit usually requires a fixed number of constants for proper execution. These constants are generated by a constant generator circuit 62. Signals from the program sequence register 60 and the path select signals from the arithmetic unit determine which program is being executed and therefore which constant should be coupled to the arithmetic unit. The function of the path select circuits will be described in more detail later.

Figure 5:
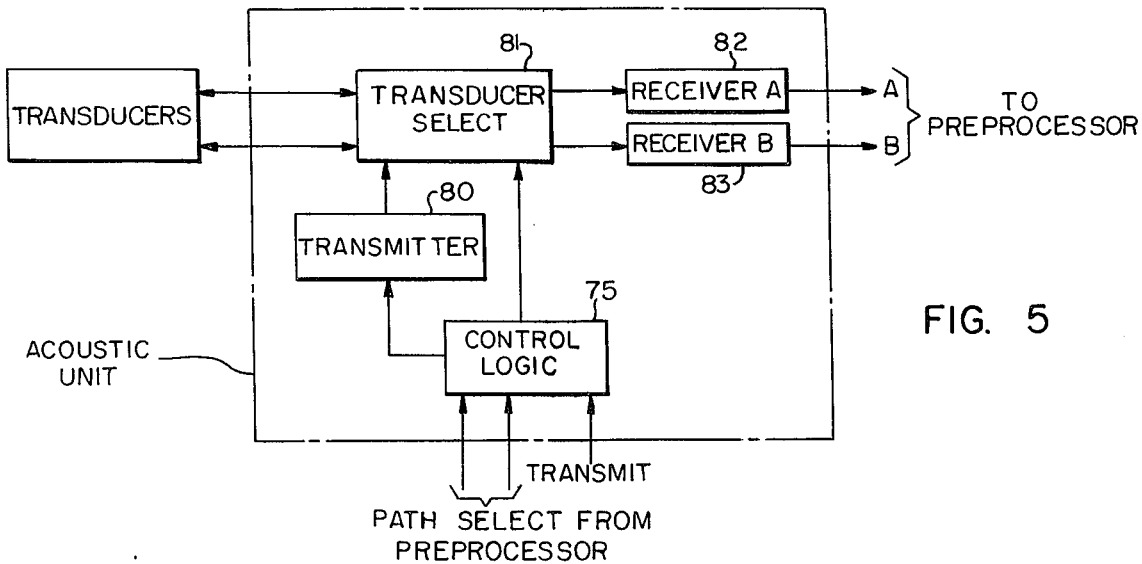
FIG. 5 is a functional block diagram of an acoustic unit for use in systems having more than one pair of transducers.
Figure 4:
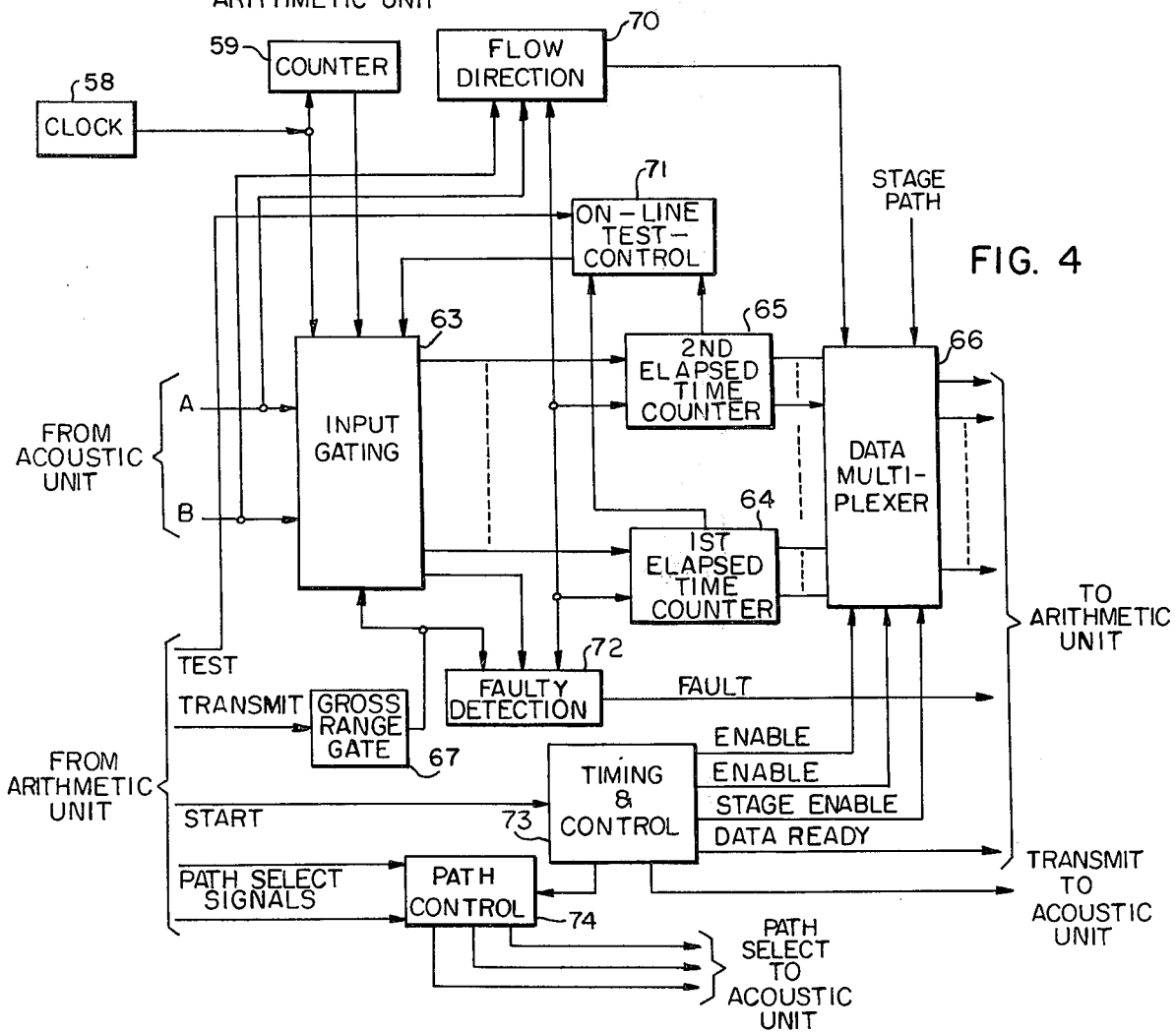
FIG. 4 is a functional block diagram of the preprocessor.

A functional block diagram of the preprocessor is shown in FIG. 4. This preprocessor is designed for use in a system utilizing multiple pairs of transducers. These pairs of transducers may be located in one or in multiple conduits. In such systems there will generally be one transmitter and two receivers selectively coupled to a plurality of transducers which are divided into pairs with each pair of the transducers defining an acoustic path which will be used to generate elapsed time signals. A block diagram of an acoustic unit usable in such a system is illustrated in FIG. 5. The operation of the preprocessors will be described with references to this acoustic unit.

The acoustic unit receives the output signals from the transducers as previously discussed. The output signals of acoustic receivers 82 and 83 are coupled through an input gating circuit 63 FIG. 4 where they are combined with signals from a clock 58, a counter 59 and the output of a gross range gate circuit 67. When the transmit signal is received, the selected transducer pair is energized to send out a pulse of acoustic energy. Simultaneously a pulse is generated which starts the first elapsed time counter 64 to begin counting at a rate which is selected by the input gating circuit 63 from the possible outputs of the clock 58 and counter 59. The counter rate selected will depend upon the particular installation and is generally determined by the length of the acoustic path to be measured. When the first signal is received by either of the receivers 82 or 83, (FIG. 5) the first elapsed time counter 64 stops counting. The number contained in the first elapsed time counter 64 at this time has a predetermined relationship to the elapsed time between time $T_0$ and $T_1$ illustrated in FIG. 1A. When the first elapsed time counter 64 stops counting the second elapsed time, counter 65 begins counting and continues to count until the second pulse is received from either of the acoustic receivers, 82 or 83, indicating that pulse 23 illustrated in FIG. 1A has been received. At this point the second elapsed time counter 65 contains a number which has a predetermined relationship to the time difference between $T_1$ and $T_2$ illustrated in FIG. 1A. These two numbers are gated through a data multiplexer 66 to arithmetic unit. From this data the arithmetic unit calculates the velocity of the liquid relative to the pair of transducers used in generating the data and from the velocity calculates the flow rate.

The preprocessor also includes a flow direction circuit 70 (FIG. 4). This circuit detects which of the receiver 82 or 83 generated the first pulse illustrated in reference numeral 26 in FIG. 1A. This determines the direction of flow of the liquid relative to the sensors and is fully explained in the previous reference incorporated into this application and will not therefore be described in detail here.

The preprocessors also includes an on-line test control circuit 71. This circuit receives a signal from the arithmetic processing unit to indicate that time is available which is not required to process the data being generated by the leading edge flowmeter and that this time can be used to run tests of the digital processors to determine that it is working properly. When this signal is received from the arithmetic unit, the on-line test control 71 couples through the input gating circuit 63, pulses which cause the first and second elapsed time counters 64 and 65 to count to predetermined values. These values are then coupled by the data multiplexer 66 to the arithmetic processor where they are processed to generate test answers. These answers are compared to pre-established values to determined whether or not the digital processor is functioning properly. The preprocessor also includes a faulty data detection circuit 72. This circuit is designed to perform a rough check of the acoustic signals received by the acoustic receivers 82 and 83 to determine that these signals are within reasonable ranges thereby establishing a level of confidence that they are correct. This circuit receives gross range gates and the output signal of the input gating circuit 63 and generates a fault signal if the signals from the acoustic receivers 82 and 83 are not received within the gross range gates. This fault signal is coupled to the arithmetic unit and is used by the arithmetic unit to ignore data which is generated by pulses from the acoustic receivers falling outside the gross range gate. Additionally, the arithmetic unit is programmed to perform additional data validity checks. One useful check is to check the change in the velocity between successive samples to assure that it is within a predetermined range. Invalid signals are ignored. If at least one but less than a predetermined number of valid data samples are received within a predetermined time the processor calculates the flow and generates an error signal. If no valid data is received during this predetermined time, the last calculated value is displayed.

A timing and control circuit 73 generates enable signals to the data multiiplexer 66 for data from the first and second elapsed time counters 64 and 65 and the stage data and generates data ready signals indicating to the arithmetic unit that data is now available and can be gated into the arithmetic unit for processing.

A path control circuit 74 receives path select signals from the arithmetic unit and signals from the timing and control unit and generates output signals to the acoustic unit which are processed by the acoustic unit to select the transducer pairs to be used in making the measurement. The timing and control circuit 73 generates a transmit pulse which energizes the selected transducers to inject the acoustic signal into the liquid.

Acoustic unit for a multipath system is illustrated functionally in FIG. 5. The acoustic unit includes control logic 75 which receives path select and transmit signals from the preprocessor and generates signals which are combined with the output of the acoustic transmitter 80 and a transducer select circuit 81 to energize the proper pair of transducers. This acoustic unit is similar to the one previously described with references to FIG. 1 except that provisions are provided for using more than one pair of transducers to permit measurements along more than one path. A stage detector (not shown) is utilized to measure the level of water in open stream measurement. A level measurement is necessary because the flow rate is a function of the cross sectional area of the liquid.

The arithmetic section illustrated functionally in FIG. 2 is capable of performing arithmetic and logic functions in the order as specified by the programmer illustrated in FIG. 3. In order to properly program the system to perform the desired function the functions of each of the instructions which the arithmetic unit will execute must be carefully defined. The following is a list of instructions and their definitions which have been found to be particularly useful in solving the equations associated with the measuring flow using leading edge flowmeter.

Add (symbol *ab*).

The contents of the A register are added to the B register and the sum is returned to the A register. The contents of the B register are unchanged.

Add 1 (symbol *al*)

One is added to the contents of the A register and the sum are returned to the A register. The contents of all of the other registers are unchanged.

Subtract (symbol *s*)

The contents of the B register are subtracted from the contents of the A register and the difference returned to the A register. The contents of the B register are unchanged.

Multiply (symbol *m*)

The contents of the B register are multiplied by the contents of the C register and the product stored in the A register. The contents of the B and C registers are unchanged.

Divide (symbol *d*)

The contents of the A register are divided by the contents of the B register and the quotient stored in the C register.

Complement (symbol *ta*)

The 2'5 complement of the A register is taken and the result is returned to the A register. The sign of the A register is unchanged.

Compare magnitude (symbol *c*)

The absolute value of the contents of the B register is compared to the absolute value of the contents of the A register. If the absolute value of the B register is greater than the absolute value of the A register a condition flag flip-flop is set.

Get input (symbol *gi*)

Three words are sequentially gated in parallel to the A register and the first two serially shifted into the data storage register.

Get constant (symbol *gkn*)

A constant specified by *n* from the the constant generator is gated into the A register.

Get content of C (symbol *gc*)

The contents of the C register are serially shifted into the A register and recirculated into the C register.

Get data (symbol *gb*)

The content of the B register is serially shifted into the A register. During this process, the data register rotates with the content of the B register being shifted into the next word location in the data register and the last word in the data register transferred to the B register.

Get Q store (symbol *gq*)

Serially shift 28 bits from the Q register into the A and C registers such that the upper end of the C register acts as an extension of the A register at its lower end.

Transfer to C (symbol *tc*)

The content of the A register is right shifted into the C register and recirculated into the A register.

Transfer to data register (symbol *tb*)

The content of the A register is right shifted into the B register and the content of the B register is shifted into the data register.

Transfer to Q (symbol *tq*)

Transfer the content of the seven lower bits of the A register and 21 bits of the B register into the Q register. The contents of the A and B registers are set to zero.

Transfer to output buffer (symbol *to*)

The contents of the A register are transferred to the output buffer register and the data flag is set indicating that data is available to the display systems.

Rotate Q (symbol *rq*)

The contents of the combined Q store and the Q register is circular shifted 28 bits.

Rotate data (symbol *rbn*)

The contents of the data store register are serially shifted through the B register 21 bits at a time for *n* number of times.

Shift (symbol *shcn*)

The content of the A register are right circular shifted a number of bits specified by *n*. The sign of the A register is unchanged.

Shift (symbol *shn*)

The contents of the A register is right shifted a number of bits specified by *n*. The contents of the A register are not recirculated.

Right circular shift bits A (Symbol *schn*)

The contents of the A register are right circular shifted the number of bits specified by *n*.

Set jump address (symbol *jsn*)

A flip-flop specified by n in the jump address register specified by *n* is set.

Jump conditional (symbol *jcn*)

The contents of the jump address register are transferred to the program sequence register to determine the next step in the program if the conditional flag specified by *n* is set.

Jump (symbol *j*)

The contents of the jump address register are transferred to the program sequence register to determine the next step in the program. The previous program sequence address is stored in the jump address register.

Initialize (symbol *i*)

If this is the first sample of the period over which the data is to be averaged, the contents of the Q register and the Q store are set to zero otherwise the contents of the Q register are serially shifted into the Q store.

Transfer to output buffer from T register (symbol *tot*)

The output of the T register is gated into the data register and the data available flip-flop set is to generate the data ready flag.

Rotate T (symbol *rt*)

The contents of the combined T register and the T store are right shifted and recirculated 14 bits.

The flow rate of the liquid 20 with respect to the transducers 11 and 12 and conduit 10 shown in FIG. 1 can be found by solving the following equation using the above described digital processor.

$$Q_n = \frac{K(T_2 - T_1)}{T_1 T_2}$$

In the above equation constant K includes all the fixed parameters of the system including those related to the geometry of the acoustic path and the units used in displaying the calculated results. $K$ may also be a computed value and in general may be computed by the same computer used to solve the above equation. These computations may be made in real time.

The speed of sound in the liquid may also be calculated if desired.

The detail theory used in developing the above equation is discussed in detail in the Patent and Articles previously referenced in this specification. The above equation is for only one path. However, the concept can be extended to a multipath system. Flow through conduits having nonuniform flow of profiles can also be accurately calculated. The total flow Q is calculated using the following equation $$Q = \overset{n}{\underset{1}{\epsilon}} Q_n$$

The disclosed system is particularly advantageous in that the above equation is solved by a hard wire digital processor which is adaptable to both closed conduit and open stream type measurement. Another advantage of the hard wired system is that the memory is non-volatile; that is, the program is not lost when the power fails and other types of system disturbances which may temporarily upset sentitive circuits. This approach also permits the arithmetic unit, the preprocessor and the programmer to be tailored to the application. This eliminates excess and seldom used hardware which is incorporated into a general purpose digital computer.

The following program is a list of instructions executed by the previously discussed arithmetic unit and programmer in solving the above discussed generalized flow equation. It should be emphasized that each instruction executed represents a specific step in the program sequence register 60 illustrated in FIG. 3.

| Program Step | Instruction |
|---|---|
| 1 | i |
| 2 | js1 |
| 3 | jc |
| 4 | gi |
| 5 | shc13 |
| 6 | tc |
| 7 | gkn |
| 8 | sh1 |
| 9 | tb |
| 10 | gc |
| 11 | s |
| 12 | tc |
| 13 | sh2 |
| 14 | rb5 |
| 15 | ab |
| 16 | tb |
| 17 | m |
| 18 | tb |
| 19 | rb4 |
| 20 | gb |
| 21 | rb1 |
| 22 | d |
| 23 | gc |
| 24 | rb3 |
| 25 | tb |
| 26 | rb5 |
| 27 | gb |
| 28 | shc12 |
| 29 | tc |
| 30 | tb |
| 31 | m |
| 32 | tb |
| 33 | gkn |
| 34 | tc |
| 35 | m |
| 36 | rb2 |
| 37 | tb |
| 38 | gkn |
| 39 | tc |
| 40 | rb2 |
| 41 | m |
| 42 | rb4 |
| 43 | ab |
| 44 | ta |
| 45 | rb1 |
| 46 | tb |
| 47 | gkn |
| 48 | ab |
| 49 | ta |
| 50 | tc |
| 51 | — |
| 52 | — |
| 53 | rb5 |
| 54 | m |
| 55 | sh2 |
| 56 | tb |
| 57 | gq |
| 58 | ab |

-continued

| Program Step | Instruction |
|---|---|
| 59 | ta |
| 60 | tb |
| 61 | gc |
| 62 | sh12 |
| 63 | a1 |
| 64 | a1 |
| 65 | tq |
| 66 | rb2 |
| 67 | js2 |
| 68 | jc2 |
| 69 | rq1 |
| 70 | gq |
| 71 | jc3 |
| 72 | gc |
| 73 | jc3 |
| 74 | tb |
| 75 | gkn |
| 76 | c |
| 77 | jc3 |
| 78 | gq |
| 79 | sh1 |
| 80 | d |
| 81 | gc |
| 82 | sh2 |
| 83 | |
| 84 | rb5 |
| 85 | tb |
| 86 | js4 |
| 87 | jc4 |
| 88 | rb3 |
| 89 | ab |
| 90 | ta |
| 91 | rb1 |
| 92 | ab |
| 93 | ta |
| 94 | rb1 |
| 95 | ab |
| 96 | ta |
| 97 | rb2 |
| 98 | sh4 |
| 99 | ab |
| 100 | ta |
| 101 | rb5 |
| 102 | tb |
| 103 | rb1 |
| 104 | gb |
| 105 | sh15 |
| 106 | a1 |
| 107 | shc5 |
| 108 | rb4 |
| 109 | tb |
| 110 | js2 |
| 111 | jc6 |
| 112 | gkn |
| 113 | js6 |
| 114 | c |
| 115 | gb |
| 116 | jc3 |
| 117 | rb4 |
| 118 | gb |
| 119 | d |
| 120 | gkn |
| 121 | sh8 |
| 122 | tb |
| 123 | gc |
| 124 | sh5 |
| 125 | ta |
| 126 | ab |
| 127 | ta |
| 128 | a1 |
| 129 | to |
| 130 | |
| 131 | |
| 132 | tb |
| 133 | gkn |
| 134 | to |
| 135 | m |
| 136 | shc |
| 137 | js5 |
| 138 | jc5 |
| 139 | tc |
| 140 | gkn |
| 141 | tb |
| 142 | m |
| 143 | tot |
| 144 | js7 |
| 145 | j |
| 146 | tot |
| 147 | rt |
| 148 | tq |

| Program Step | Instruction |
| --- | --- |
| 149 | tb |
| 150 | js2 |
| 151 | j |
| 152 | | gkn value of n depends on specific application

This program performs all the arithmetic operations necessary to solve the above discussed equations. The program also performs the previously described self-check of the system hardware. The data validity checks may be added by modifying the program.

The above described system is also adaptable to other types of fluid velocity measurements. For example, the system can be adapted to measure the velocity of a ship through the water. In such applications at least two pairs of transducers are required so that the forward and transverse velocities of the ship can be measured. The following program utilizes the output signals of two pairs of transducers to determine the velocity of the ship through the water.

| Program Step | Instruction |
| --- | --- |
| 1 | l |
| 2 | j |
| 3 | jcn |
| 4 | gi |
| 5 | shc13 |
| 6 | tc |
| 7 | sh6 |
| 8 | ab |
| 9 | tb |
| 10 | m |
| 11 | tb |
| 12 | rb2 |
| 13 | gb |
| 14 | sch12 |
| 15 | tc |
| 16 | gb |
| 17 | rb1 |
| 18 | d |
| 19 | gk1 |
| 20 | tb |
| 21 | m |
| 22 | sh3 |
| 23 | tb |
| 24 | gq |
| 25 | ab |
| 26 | ta |
| 27 | rb4 |
| 28 | tb |
| 29 | gc |
| 30 | sh12 |
| 31 | al |
| 32 | al |
| 33 | tq |
| 34 | rb2 |
| 35 | gb |
| 36 | sch19 |
| 37 | rb3 |
| 38 | s |
| 39 | sh3 |
| 40 | rb2 |
| 41 | d |
| 42 | gk2 |
| 43 | tb |
| 44 | m |
| 45 | sh6 |
| 46 | to |
| 47 | js2 |
| 48 | jc2 |
| 49 | rq |
| 50 | gq |
| 51 | js3 |
| 52 | gc |
| 53 | jc3 |
| 54 | tb |
| 55 | gk3 |
| 56 | c |
| 57 | jc3 |
| 58 | gq |
| 59 | d |
| 60 | gc |
| 61 | sh4 |
| 62 | rb4 |
| 63 | tb |
| 64 | js4 |
| 65 | jc4 |
| 66 | rq |
| 67 | gq |
| 68 | js3 |
| 69 | gc |
| 70 | jc3 |
| 71 | tb |
| 72 | gk3 |
| 73 | c |
| 74 | jc3 |
| 75 | gq |
| 76 | d |
| 77 | gc |
| 78 | sh4 |
| 79 | rb4 |
| 80 | tb |
| 81 | js4 |
| 82 | jc4 |
| 83 | rb4 |
| 84 | s |
| 85 | ta |
| 86 | sh5 |
| 87 | ta |
| 88 | al |
| 89 | to |
| 90 | gb |
| 91 | ab |
| 92 | ta |
| 93 | tc |
| 94 | sh5 |
| 95 | ta |
| 96 | al |
| 97 | to |
| 98 | gk4 |
| 99 | tb |
| 100 | m |
| 101 | js5 |
| 102 | jc5 |
| 103 | tc |
| 104 | gk5 |
| 105 | tb |
| 106 | m |
| 107 | sh4 |
| 108 | to |
| 109 | no-op |
| 110 | js2 |
| 111 | j | jcn value of n depends on specific application

Another feature of the disclosed system which reduces cost and improves reliability is the elimination of peripherials required to program and operate programmable processors.

We claim:

1. A system for measuring the flow rate of a liquid comprising in combination:

a. first and second transducers; means for energizing said first and second transducers to inject first and second acoustic signals into said liquid;

b. means for detecting and for producing first and second elapsed time signals related to the flow rate of said liquid in response to said acoustic signals; and c. programmable digital processor means utilizing said first and second elapsed time signals to calculate the flow rate of said liquid by solving the following equation, $$Q_n = \frac{K(T_2 - T_1)}{T_1 T_2}$$

wherein the terms are defined as;
$Q_n$ = the flow rate of said liquid
$K$ = is a constant
$T_1$ = is the first elapsed time signal
$T_2$ = is the second elapsed time signal.

2. A system in accordance with claim 1 further including means for establishing the validity of said first and second elapsed time signals within a predetermined confidence level.

3. A system in accordance with claim 1, further including self-checking apparatus for verifying the operation of said programmable digital processor means.

4. A system in accordance with claim 1 further including means for determining the direction of flow of said liquid with respect to said transducer means.

5. A system in accordance with claim 1, wherein said programmable digital processor means is hard wired.

* * * * *